March 22, 1927.
H. E. HONTZ
CREAM DEPOSITOR FOR HAND ROLL CENTERS FOR CANDIES
Filed Sept. 18, 1920    2 Sheets-Sheet 1
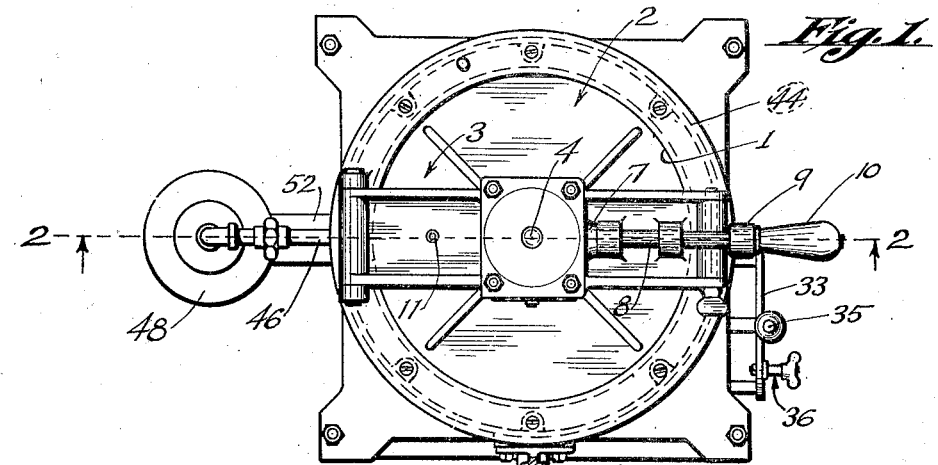
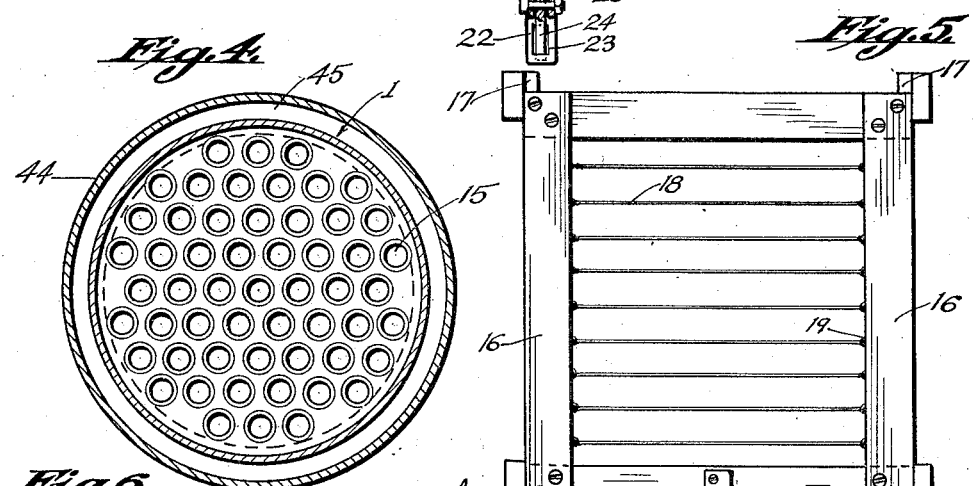
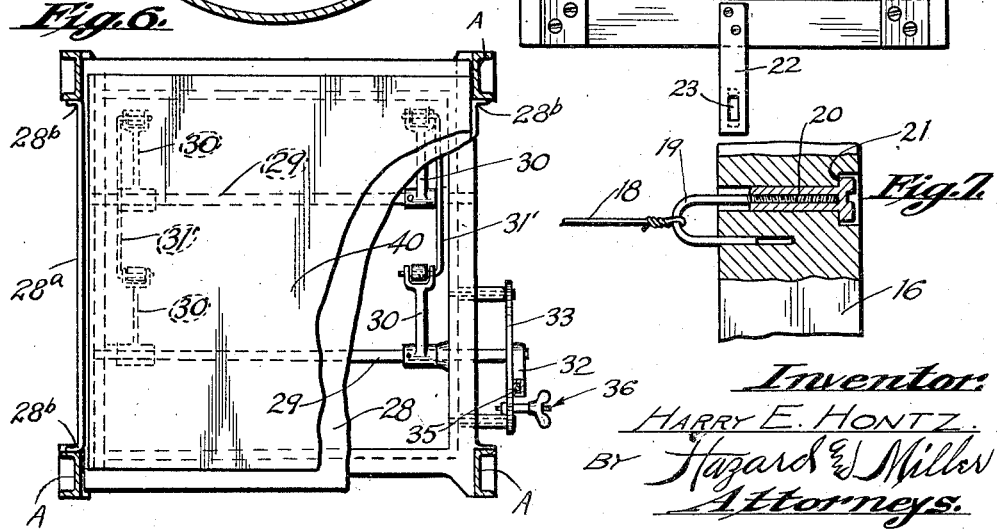
Inventor:
HARRY E. HONTZ
By Hazard & Miller
Attorneys.

March 22, 1927. 1,622,115
H. E. HONTZ
CREAM DEPOSITOR FOR HAND ROLL CENTERS FOR CANDIES
Filed Sept. 18, 1920   2 Sheets-Sheet 2
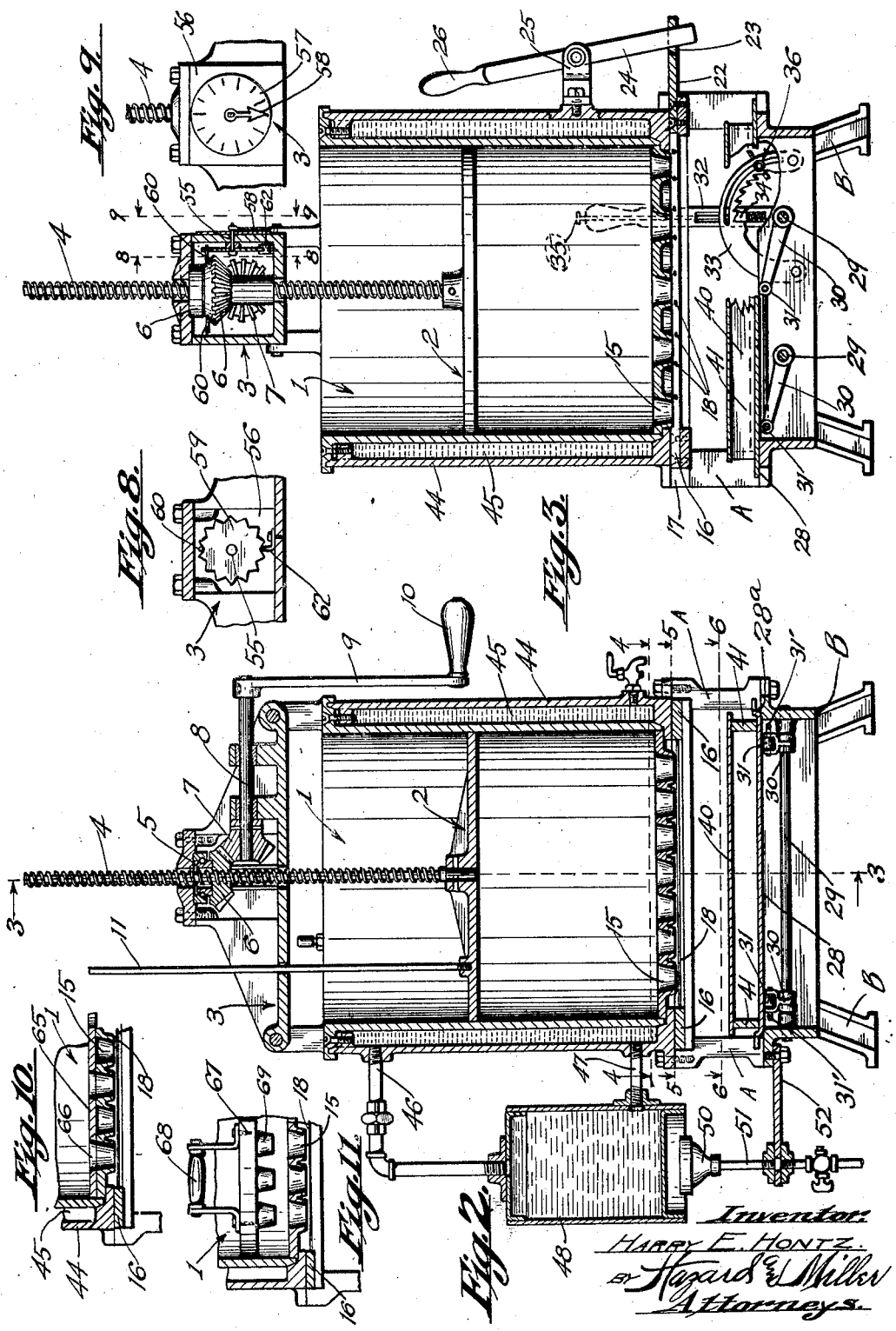
Inventor:
HARRY E. HONTZ
by Hazard & Miller
Attorneys Patented Mar. 22, 1927.

1,622,115

UNITED STATES PATENT OFFICE.

HARRY E. HONTZ, OF LOS ANGELES, CALIFORNIA, ASSIGNOR TO REX PRODUCTS CO., INC., OF LOS ANGELES, CALIFORNIA, A CORPORATION OF CALIFORNIA.

CREAM DEPOSITOR FOR HAND-ROLL CENTERS FOR CANDIES.

Application filed September 18, 1920. Serial No. 411,231.

This invention relates to improvements in cream depositors as fully set forth and claimed in my abandoned application for Letters Patent filed June 4, 1919, Serial No. 301,841.

A leading object of my invention is to provide a cream depositor having means for rapidly making the deposits and having means for guiding the operator and operation so that the successive deposits may be uniform in size and of the exact size desired.

It is a further object of the invention to provide a more efficient gage to be employed in connection with the machine. It is a still further object of the invention to provide means whereby the machine is so arranged as to deposit different quantities of cream centers, and to also so arrange the openings through the die of the machine in such manner as to uniformly space the cream deposited upon a tray. The invention also contemplates the provision of means whereby the die plate of the machine may be readily cleaned.

Further objects of the invention will be readily understood from the following description of the accompanying drawings, in which:

Figure 1 is a top plan view of the machine.

Fig. 2 is a longitudinal section on the line 2—2 of Fig. 1.

Fig. 3 is a longitudinal section on the line 3—3 of Fig. 2.

Figs. 4, 5 and 6 are transverse sections on the lines 4—4, 5—5, 6—6 of Fig. 2.

Fig. 7 is a detail plan view partly broken away, of the frame for the cutting wires and one of said wires showing the connection between the same.

Figs. 8 and 9 are detail sections on the lines 8—8 and 9—9 of Fig. 3.

Figs. 10 and 11 are fragmentary longitudinal sections through a machine constructed in accordance with the invention showing respectively an auxiliary die plate and a cleaning board employed in said machine.

The machine forming the present invention is of the same general type as the machine covered by my aforementioned application, and consists essentially of a receptacle adapted to contain the cream, a plunger adapted to be moved downwardly within the receptacle so as to force the cream through openings in a die plate, an adjustable support for a tray beneath the die plate and means for cutting off the cream forced through the die plate and deposited upon the tray.

The receptacle for the cream in the present instance is shown as a cylindrical receptacle 1 having the disc plunger 2 fitting tightly within the same. A bridge 3 is hinged to the top of the cylindrical receptacle so as to be positioned across the top of the receptacle, and a compression screw 4 extends upwardly from the plunger and is journaled in a bearing 5 carried by the bridge. The screw 4 is threaded through a beveled pinion 6 and is raised and lowered through the rotation of said pinion. The pinion may be rotated through engagement by a second bevel pinion 7 fixed upon a shaft 8 journaled upon bridge 3, and provided with a crank arm 9 having the handle 10. In order to prevent rotation of the compression screw and plunger disc relative to cylinder 1, a guide rod 11 preferably projects from plunger 2 through an aperture in bridge 3.

The die plate closing the lower end of cylinder 1 is shown in detail in Fig. 4. The plate is provided with a plurality of die openings 15 which preferably taper in width downwardly. These die openings are preferably so spaced throughout the surface of the die plate as to leave a space of uniform width surrounding each of the openings and between adjacent openings. By this arrangement the pressure of plunger 2 against the die plate will be equally distributed to the various die openings so that the cream within the receptacle 1 will be uniformly compressed and forced through said die openings.

Beneath the die plate a cutting frame is arranged, said frame being shown in Fig. 5. The side bars of the frame are shown at 16 and the frame is positioned for transverse movement relative to the machine by means of guides 17. A plurality of cutting wires 18 extend across the cutting frame and are fixed at their respective ends to opposite side bars of the cutting frame. The wires may be tightened by having their ends engaged by loops 19, the arms of said loops being received in apertures of the side bars 16 as clearly shown in Fig. 7. A screw sleeve 20 is received over one of the arms of each of the loops 19 and arranged for threaded engagement therewith so that by turning said screw sleeve which is held against longitudinal displacement relative to bar 16 by means of the shoulder 21 upon the sleeve. the loop 19 may be moved toward and away from the bar 16.

The cutting frame is moved back and forth beneath the die plate in order to cut off the cream deposits projected through the same. For this purpose the cutting frame is provided with an arm 22 having an opening 23 in which is received the end of a lever 24 which is pivoted to a bracket 25 carried by the machine. The opposite end of the lever is provided with a handle 26 for actuating the same so as to reciprocate the cutting frame.

A gauge plate 28 is arranged beneath the cutting frame and is adapted to be positioned at various elevations. For this purpose shafts 29 are journaled beneath the gauge plate and are provided with arms 30 having rollers 31 upon the swinging ends of the same. These rollers abut against the under surface of the gauge plate so that when the shafts 29 are rocked the gauge plate will be raised and lowered. The arms 30 are connected for dependent operation by means of a rod 31' and one of the shafts 29 is provided with an actuating lever 32 for rocking said shafts. An arcuate ratchet plate 33 co-operates with a pawl 34 carried by lever 32 to lock the lever in adjusted position. The pawl may be retracted through an actuating plunger 35 in order to unlock the lever. Adjustable stop 36 is preferably arranged upon arcuate plate 33 for limiting the movement of the lever 32 and thereby limiting the elevation of the gauge plate.

The cylindrical receptacle is supported upon supporting posts A, which in turn are supported upon a legged frame B. The gauge plate 28 from its front to its back edge is slightly longer than the distance between the front supporting posts to the back supporting posts, so that the side edges of the gauge plate 28 near its front and back edges bear against the side faces of the supporting posts. The side edges of the gauge plate 28 between the front and back supporting posts are bent upwardly, as indicated at 28$^a$, and the ends of these up-bent side edges are cut away from the body of the plate and bent outwardly as clearly shown upon Figs. 2 and 6 and as indicated by the reference character 28$^b$. In this way the supporting posts A serve as vertical guides, limiting the movement of the gauge plate 28 to a vertical movement so that this plate will not be influenced by any movement of the arms 30 or the rollers 31 thereon in raising or lowering which might tend to move the gauge plate laterally. In this way it will be understood that the supporting posts provide guides which vertically guide the gauge plate 28 during its raising or lowering.

A tray arranged to receive the cream deposits is positioned upon gauge plate 28, said tray being shown as comprising a base 40 mounted upon strips 41 so as to provide an air space beneath the base of the tray between the latter and the gauge plate. By this arrangement cooling air may circulate beneath the tray for cooling the cream deposits.

In order to provide for the efficient operation of the machine, it is necessary that the cream within the compression chamber be maintained in a heated condition and in order to provide for the uniform continued heating of the cream during the entire operation of the machine, a heating fluid such as water is adapted to be circulated around the compression chamber. As an instance of this arrangement a shell 44 surrounds the receptacle 1 so as to form a water jacket 45 and this water space is provided with an intake pipe 46 adjacent the top of the same and a water discharge 47 at its base. A water tank 48 is arranged at the side of the main receptacle of the machine and the pipe 46 communicates with the top of this tank while the pipe 47 leads into the same adjacent its base. A burner 50 is arranged beneath the water tank for heating the water in the same, said burner being preferably supported by its fuel supply pipe 51 which is in turn carried by a bracket 52 extending from the main frame of the machine.

In order to gauge the position of plunger 2 within the compression receptacle and to guide the operator in manipulating the crank to move the plunger to make the exact deposit desired, a shaft 55 preferably extends through a casing 56 forming a part of bridge 3. A dial plate 57 is formed upon the outer surface of this casing with the shaft 55 extending through the same. A guide pointer 58 is fixed upon the shaft for co-operation with the dial plate 57. A star wheel 59 is fixed upon the inner end of shaft 55 adjacent the bevel pinion 6 and said pinion is provided with diametrically opposed pins 60 arranged to engage successive points of the star wheel during rotation of the pinion in order to rotate the star wheel the distance between adjacent points of the same at each half revolution of pinion 6. The star wheel may be held against rotation until engaged by one of the pins 60 by means of a spring pawl 62 mounted in casing 56 and engaging the star wheel. By this arrangement the pointer 58 is adapted to indicate half revolutions of pinion 6 and as a consequence will indicate the position of the plunger within the compression chamber. The object of the guide pointer 58 and the co-operating parts is to enable the operator to move the crank to move the plunger just enough to make deposits of the desired size and to increase or decrease the size by increasing or decreasing the movement of the guide pointer.

If it is desired to form larger cream deposits than can be made with die plate 15 without the various deposits running together upon the receiving tray, an auxiliary die plate may be employed. Such an auxiliary plate is shown at 65 in Fig. 10 as positioned within the receptacle 1 upon the regular die plate. This auxiliary plate is provided with openings 66 in alignment with every other one of the openings in the regular die plate and as a consequence large cream deposits may be made through the auxiliary die plate without the possibility of said deposits running together upon the receiving tray.

In order to clean the openings through the die plate of the machine, a cleaning board such as shown in Fig. 11 is preferably employed. This cleaning board is shown as a disc 67 fitting snugly within receptacle 1 and having handle 68 upon its upper surface. The lower surface of the board is provided with depending plugs 69 arranged in alignment with the various openings of the die plate so that by forcing the cleaning board downwardly in the compression chamber, the various plugs will be projected into the various die openings for discharging the cream remaining in the same.

Various changes may be made in the construction as thus set forth without departing from the spirit of the invention.

What is claimed is:

1. A cream depositor comprising a receptacle, a die plate forming the bottom of said receptacle, a plunger reciprocable in said receptacle, means for causing said plunger to force material in said receptacle through the die plate, cutting means arranged beneath the die plate, a gauge plate disposed beneath said cutting means, guide means for causing said gauge plate to move vertically, rock shafts disposed beneath said gauge plate, means carried by said rock shafts for raising and lowering said gauge plate upon rotation of the rock shafts, and means for rotating said rock shafts in unison.

2. A cream depositor comprising a receptacle, a die plate forming the bottom of said receptacle, a plunger reciprocable in said receptacle, means for causing said plunger to force material in said receptacle through the die plate, cutting means arranged beneath the die plate, a gauge plate disposed beneath said cutting means, guide means for causing said gauge plate to move vertically, rock shafts disposed beneath said gauge plate, arms carried by said rock shafts, rollers mounted upon said arms engageable upon the under side of said die plate to raise and lower it upon rotation of said rock shafts, and means for rotating said rock shafts.

In testimony whereof I have signed my name to this specification.

HARRY E. HONTZ.